United States Patent [19]

Morellini

[11] Patent Number: 4,635,781
[45] Date of Patent: Jan. 13, 1987

[54] PROTECTION APPARATUS

[76] Inventor: Peter Morellini, P.O. Box 188, Ingham, Queensland 4850, Australia

[21] Appl. No.: 673,754

[22] PCT Filed: Feb. 23, 1984

[86] PCT No.: PCT/AU84/00025
  § 371 Date: Oct. 23, 1984
  § 102(e) Date: Oct. 23, 1984

[87] PCT Pub. No.: WO84/03349
  PCT Pub. Date: Aug. 30, 1984

[30] Foreign Application Priority Data

Feb. 23, 1983 [AU] Australia ............................ PF8162

[51] Int. Cl.4 .............................................. F16P 7/00
[52] U.S. Cl. ................................... 192/150; 192/116.5
[58] Field of Search .............. 192/116.5, 150; 464/23; 137/38

[56] References Cited

U.S. PATENT DOCUMENTS

| 2,913,977 | 11/1959 | Claas et al. | 192/150 X |
| 2,984,090 | 5/1961 | Bennett | 464/23 |
| 3,761,911 | 9/1973 | Hiltz et al. | 200/61.08 |
| 4,307,799 | 12/1981 | Zouzoulas | 192/150 |
| 4,485,832 | 12/1984 | Plemmons et al. | 137/38 |

FOREIGN PATENT DOCUMENTS

| 0126625 | 2/1948 | Australia | 192/150 |
| 208283 | 7/1956 | Australia | |
| 51-137977 | 11/1976 | Japan | |

Primary Examiner—Rodney H. Bonck
Assistant Examiner—Alan G. Towner
Attorney, Agent, or Firm—Charles W. Fallow; Martin P. Hoffman

[57] ABSTRACT

Protection apparatus (15) for use with universal drive shafts (13) and including a sensor (16) mounted in spaced relationship relative to the shaft (13) and actuated when the shaft undergoes a predetermined degree of movement beyond its normal attitude, actuation of the sensor causing drive to be removed from the drive shaft (13) and/or generation of a warning signal.

11 Claims, 9 Drawing Figures

PROTECTION APPARATUS

This invention relates to protection apparatus and in particular to protection apparatus associated with universal drive shafts such as power take-off shafts of tractors or other prime movers or universal drive shafts or so called propellor shafts of vehicles such as motor cars or trucks or other machinery.

Universal drive shafts have many applications in trnasmitting motive power from a drive unit such as an internal combustion engine to a driven unit such as a gear box or agricultural or mining implement. In most instances, the drive shaft is provided with a pair of universal joints at its opposite ends adjacent the drive and driven unit respectively. In one particular arrangement, for example, as used in tractors or other prime movers, a power take off unit is provided at the rear of the prime mover and a universal drive shaft extends between the power take off unit and machinery to be driven, for example a hay baler, irrigator, sprayer, pump, header, auger, feed mixer, slasher, mower, post hole digger, cultivator, welder or cane haul out trailers with a draw-bar hitch. In some instances, the machinery which is driven by the drive shaft is mounted to the prime mover three point linkage and can be raised or lowered as desired, in which case the universal drive shaft will pivot through a range of vertical angles. If, however, the apparatus is lowered or raised to such an extent that the universal drive shaft is pivoted beyond a certain safety angle, damage can be caused to the universal joints or in some instances to the drive mechanism of the prime mover. In other circumstances, the machinery is trailed from a prime mover, in which case the drive shaft is again pivoted through a range of horizontal angles and similar problems to the above again arise. Similarly in the case where an implement is supported by a three point linkage, breakage of one of the links can cause the implement to skew to one side causing the drive shaft to pivot beyond a safe angle.

In further circumstances, the breakage of say the rear universal joint can result in the drive shaft whipping around and causing damage say to the prime mover or machinery chassis or gear box.

If say, the front universal joint fails, the drive shaft may drop to the ground or roadway causing damage to the rear universal joint, prime mover differential or trailed machinery. Where motor cars or trucks are involved, the drive shaft can dig into the ground or roadway causing either damage to the vehicle or in some cases the vehicle to overturn and perhaps injury to the occupants.

Similar problems to the above can arise if breakage occurs in the drive shaft itself, say due to metal fatigue. In each of the above cases the damage caused can result in expensive repairs as well as a loss of machine or vehicle working time.

The present invention aims to overcome or at least alleviate some of the above disadvantages by providing protection apparatus adapted to be associated with the universal drive shaft of a prime mover or other vehicle and to sense say breakage of the drive shaft or its associated universal joint or movement of the drive shaft beyond a predetermined angle so that damage to the prime mover or vehicle or associated machinery can be reduced or eliminated. Other advantages of the sensing and protection apparatus will become apparent from the following description.

With the foregoing and other objects in view this invention resides broadly in protection apparatus for a universal drive shaft said apparatus including sensing means adapted to be mounted adjacent said drive shaft, said sensing means being actuated in response to a predetermined degree of movement of said drive shaft beyond its normal driving attitude and means operatively associated with said sensing means and responsive to actuation of said sensing means for removing drive from said drive shaft.

In a further aspect, the sensing means is associated with a warning device so that said predetermined degree of movement of said drive shaft beyond its normal attitude can be visually or audibly indicated. This arrangement may be used with or without means for removing drive from the drive shaft.

In order that the invention may be more readily understood and put into practical effect, reference will now be made to a preferred embodiment of the invention illustrated in the accompanying drawings wherein.

Figure 1:
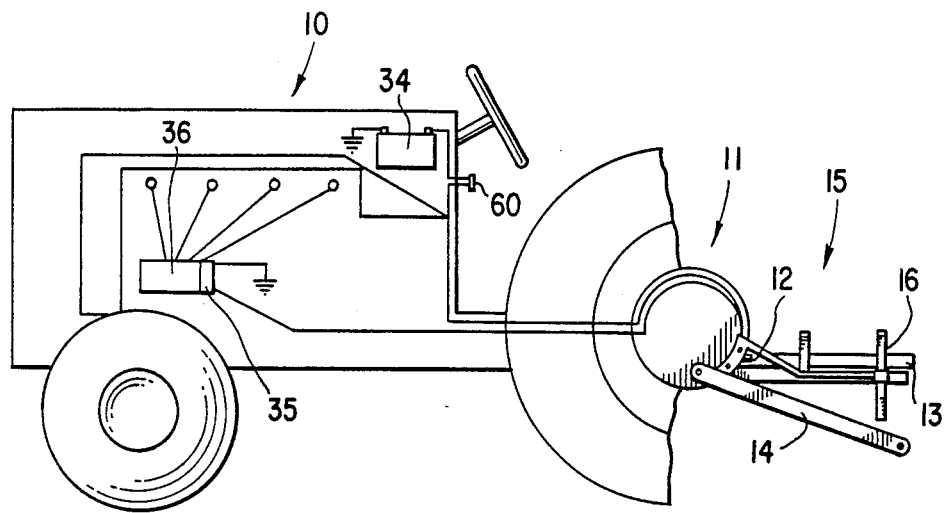
FIG. 1 is a schematic cutaway view of a tractor employing the protection apparatus according to the present invention.

Referring to FIG. 1 there is illustrated schematically a tractor 10 employing the protection apparatus according to a preferred form of the present invention. The tractor 10 is provided with a conventional power take-off unit 11 having a rearwardly extending splined shaft 12 for coupling to a universal drive shaft 13 so that drive can be transmitted to an implement, trailer or other machinery.

Preferably, the implement is supported by a conventional three point linkage arrangement (including a pair of lower links 14) which is operative to raise or lower the implement as desired. During raising or lowering of the implement, the universal drive shaft 13 will pivot about its universal joints, through a range of vertical angles. However, if the drive shaft 13 pivots beyond a predetermined angle whilst being driven, damage to the power take-off unit 11 drive shaft or universal joints can occur. Similarly if the drive shaft 13 or its universal joints break, damage can be caused to the tractor 10 or the implement.

The invention therefore provides in one aspect protection apparatus 15 associated with the drive shaft 13 and adapted to respond to movement of the drive shaft 13 beyond a predetermined range of angles to remove drive therefrom in such circumstances or to indicate to a user either located adjacent the machinery or remotely therefrom, a fault condition which then may be rectified. For this purpose, the protection apparatus 15 includes sensing means 16 responsive to displacement of the shaft beyond said predetermined range of angles and operative, in the illustrated FIG. 1 embodiment, to cause the fuel injector pump of the tractor diesel engine to stop operating so that the engine of the tractor will stop thus causing drive to be removed from the drive shaft 13.

Figure 3:
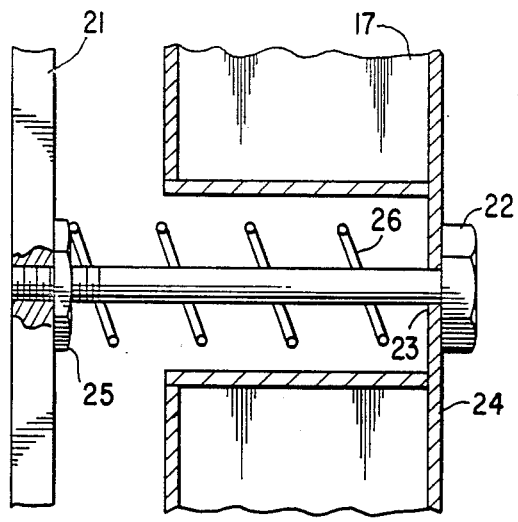
FIG. 3 illustrates in sectional view the support arrangement for the sensor touch plates.
Figure 2:
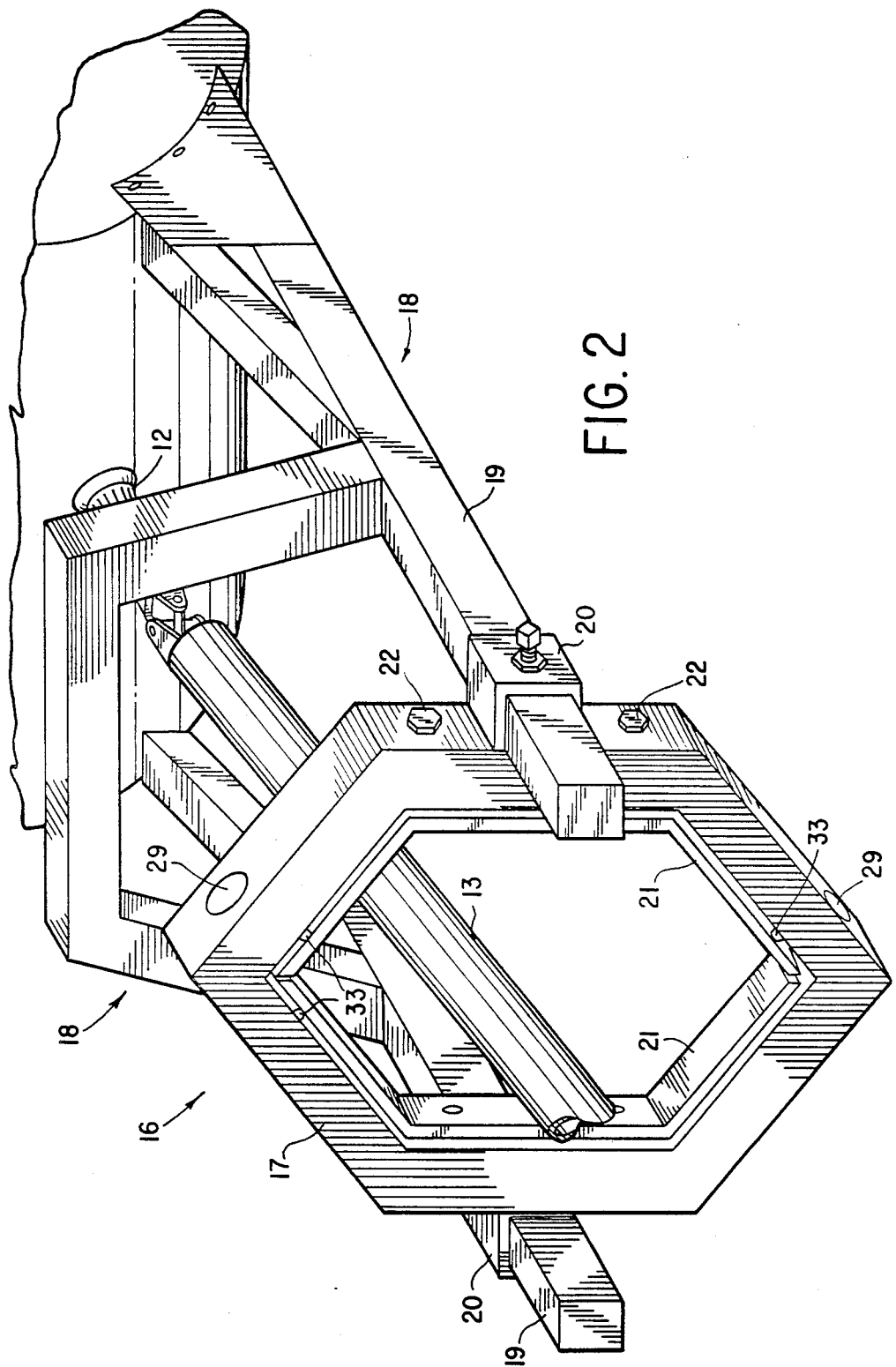
FIG. 2 is a perspective view showing a preferred form of sensor for the protection apparatus of the invention.

Preferably the sensing means 16 is of the form shown in FIG. 2 and includes an elongated hexagonal shaped housing 17 which is mounted to the rear of the tractor and which is arranged so that the universal drive shaft 13 projects therethrough. Supporting the housing in use are a pair of bracket assemblies or frame means 18 each of which is mounted to the rear of the tractor. Each bracket assembly 18 includes a rearwardly extending guide member 19 and the housing 17 is provided with respective opposite slide clamps 20 which slidably engage with the respective guide members 19 and which are lockable in any desired attitude to fix the position of the housing 17 and thus determine the angle at which the universal drive shaft will actuate the sensing means 16. Supported on the inner side of the housing 17 are a pair of opposite touch plates 21 which are configured to substantially follow the internal contour of the housing 17. Each touch plate 21 as shown in FIG. 3 is supported to the housing 17 and in spaced relationship thereto by a plurality of mounting bolts 22. The bolts 22 extend freely through apertures 23 in the outer wall 24 of the housing and are in screwed engagement with the touch plate 21 and locked thereto by lock nuts 25. Respective coil springs 26 are provided about the shanks of the bolts 22 to cooperate with the housing outer wall 24 and touch plate 21 to bias the latter away from the housing 17.

Figure 4:
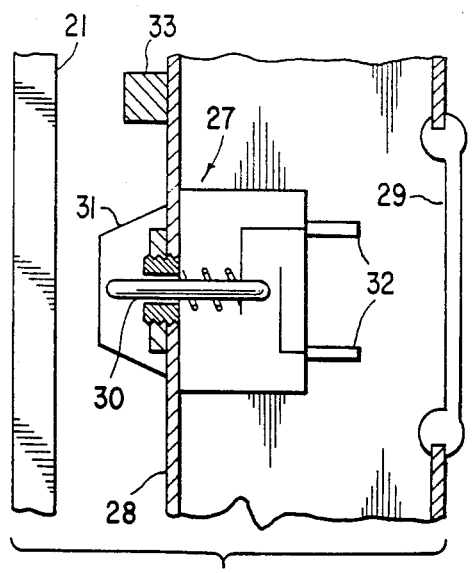
FIG. 4 illustrates in sectional view one of the switches of the sensor.

The housing 17 is also provided with switches 27, in this instance four, located at the upper and lower portions thereof. Each switch 27 as shown in FIG. 4, is mounted on an inner wall 28 of the housing 17 and is accessable through the outer wall 24 of the housing through a rubber grommet 29. Preferably each switch 27 includes a spring loaded actuator 30 which extends outwardly of the housing 17 towards the touch plate 21 and which is preferably covered by a flexible boot 31. It will be seen that the actuator 30 when pressed inwardly is operative to close the circuit between a pair of switch terminals 32. As shown, the touch plates 21 are located in spaced relationship to the switches 27 and arranged such that when the universal drive shaft 13 moves against the touch plate 21, the touch plate 21 will be moved into engagement with the switch 27 to cause actuation thereof. Preferably the inner walls 28 of the housing 17 are provided with stops 33 which limit inward movement of the touch plates 21 and which through the touch plates 21 take the weight of the drive shaft 13 after at least one switch 27 has been activated so that the switches 27 will not be damaged.

Figure 5:
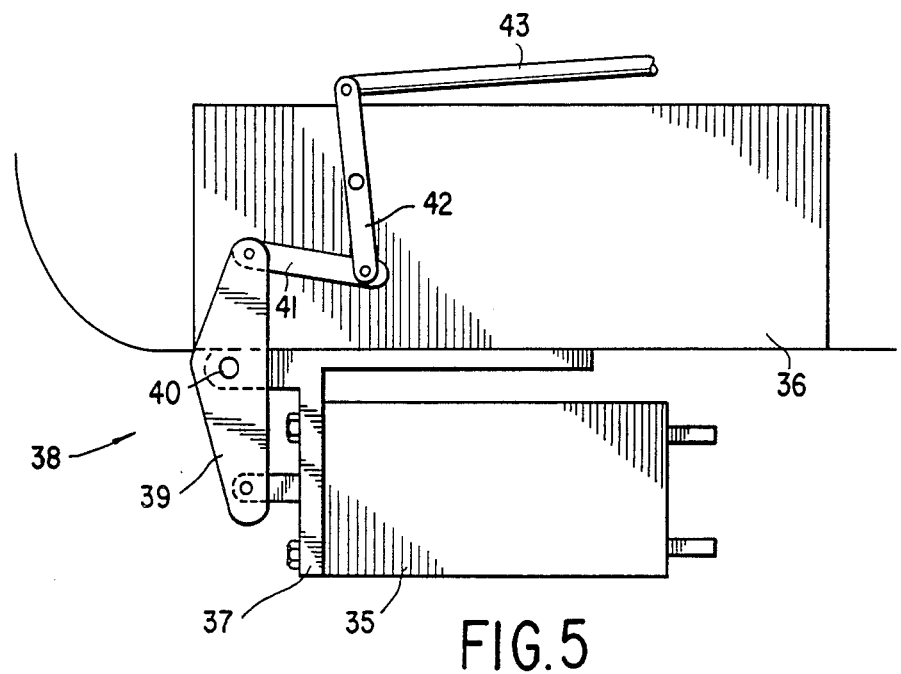
FIG. 5 illustrates one form of engine shut-down arrangement for use with the sensor illustrated in FIG. 2.

The respective switches 27 are preferably located in a parallel configuration in a circuit between the battery 34 of the tractor 10 and in this embodiment a solenoid 35 which is mounted adjacent the tractor fuel injector pump 36 and which is arranged to stop operation thereof. As shown in FIG. 5, the solenoid 35 is mounted on a bracket 37 adjacent the injector pump 36 and is linked through a linkage assembly 38 to the fuel injector pump 36. The linkage assembly 38 as shown includes a lever 39 pivotally mounted at 40 to the bracket 37 and a link 41 pivotally connected at one end to the lever 39 and at its other end to the injector pump control lever 42. As shown the injector pump control lever 42 is also connected to a manually actuable control arm 43 which extends to the tractor dashboard or cab to permit the tractor engine to be stopped manually by an operator.

In use, actuation of any one of the switches 27 in response to engagement by a touch plate 21 due say to drive shaft failure or excessive movement of the shaft will complete the circuit between the battery 34 and solenoid 35 to permit current to be applied to the solenoid 35 to actuate same. Actuation of the solenoid 35 will cause pivotal movement of the lever 39 and consequently pivotal movement of the injector pump control lever 42 to stop the pump 36. The tractor engine will then cease running so that drive will be removed from the universal drive shaft 13 and damage to the shaft or adjacent tractor or implement frame minimized.

Figure 6:
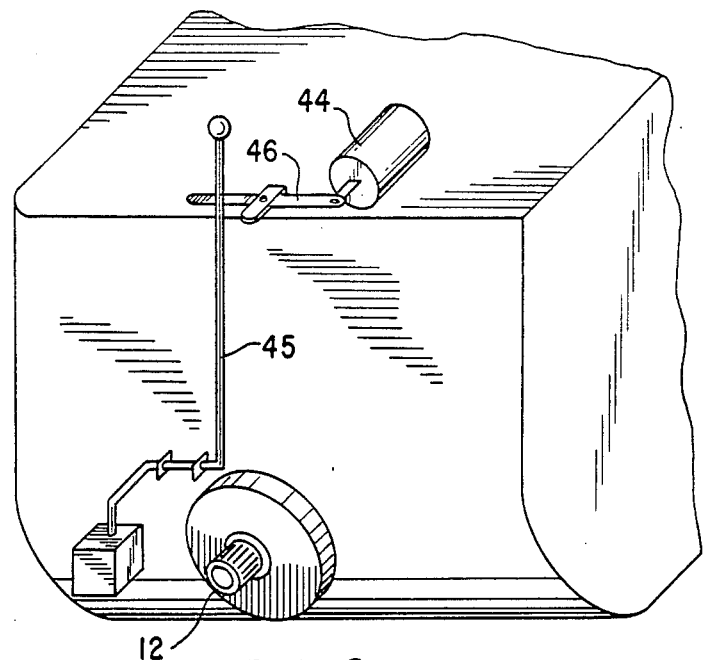
FIG. 6 illustrates an alternative engine shut-down arrangement.

In an alternative arrangement, shown in FIG. 6, the switches 27 of the sensor 16 are associated with a solenoid 44 which is operable to control operation of the power take off unit 11 of the tractor. As shown, the tractor power take off unit 11 is normally adapted to be engaged or disengaged by means of a lever 45 located at the rear of a tractor 10. The solenoid 44 is mounted adjacent the lever 45 and is operable through a pivotal link 46 to cause actuation of the lever 45 to disengage the power take off unit 11. It will be seen that operation of any one of the switches 27 wil cause current to be applied from the battery 34 to the solenoid 44 thus causing the lever 46 to move the power take off engagement lever 45 to a disengaged position to stop operation of the power take off unit 11 and thus rotation of the universal drive shaft 13.

Figure 7:
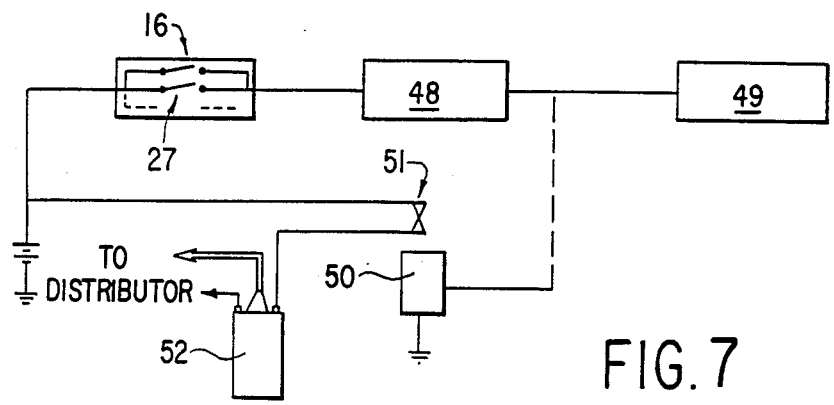
FIG. 7 is an electrical circuit of a warning system for use with the sensor illustrated in FIG. 1 and including an optional engine shut-down arrangement for spark ignition vehicles.

In FIG. 7, a sensor 16 similar to that described above is arranged in series with a semi-conductor switching network 48 which is triggered to remain in an "ON" state when one of the switches 27 of the sensor is actuated. Also located in series with the sensor 16 and semi-conductor switching network 48 is a warning device 49, for example a lamp or buzzer which will be activated when current is applied thereto from the semi-conductor switching network 48. The warning device 49 may be located on the dashboard of a vehicle or prime mover so that the fault may be indicated to a user. Alternatively the warning device may be located at a site remote from the machinery, for example in situations where a pump is left to run for a period of time and driven from a tractor power take off unit by a universal drive shaft and where the user is located at that remote site. Of course the warning device 49 may comprises a transmitter which is triggered by the semi-conductor switching network 48 to send a signal to a receiver at a remote site so that the presence of a fault can be indicated.

It will be seen that actuation of any of the switches 27 of the sensor 16 by the drive shaft will cause current to be supplied to the semi-conductor switching network 48 to cause it to change mode to an "ON" state to supply current to the warning device 49. The switching network 48 will remain in this state until the circuit is deactivated. Of course, a warning device 49 may be also provided in association with the arrangements described with reference to FIGS. 5 and 6 above to provide a visual and/or audible indication of a fault.

The above, with or without the warning device 49, may also be associated with a conventional spark ignition system of say a petrol driven engine of a vehicle such as a tractor. In this aspect, the semi conductor switching network 48 is coupled to a relay 50 which is operative to control normally closed switch contacts 51 located in the primary circuit of the vehicle ignition coil 52. Actuation of one of the switches 27 of the sensor 16 will apply current to the semi conductor switching network 48 to cause it to switch to its "ON" mode and apply current to the relay 50. This will cause the switch contacts 51 to open to remove current from the primary ignition circuit so that the engine will stop and again remove drive from the universal drive shaft.

Figure 8:
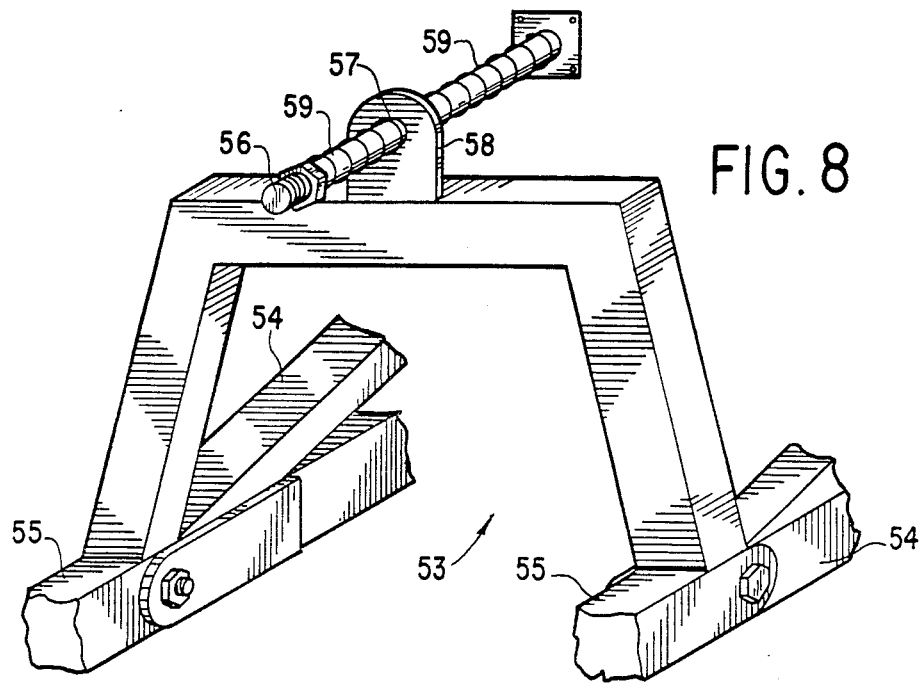
FIG. 8 is a perspective view showing an alternative mounting bracket for the sensor of the protection apparatus.

Referring now to FIG. 8, there is illustrated an alternative mounting arrangement for the sensing means 16. In this embodiment, the bracket assembly or frame 53 which supports the sensing means 16 comprises two parts 54 and 55, one frame part 54 fixed to the rear of the tractor 10 and the other frame part 55 pivotally mounted to the first part 54. A threaded shaft 56 is pivotally mounted to the tractor and extends freely through an aperture 57 on an upstanding lug 58 on the bracket part 54. A pair of springs 59 are disposed about the shaft 56 on either side of the lug 58 to act thereagainst and maintain the bracket assembly 54 in the desired position.

The above described arrangement is particularly useful in a protection system incorporating means to disengage the power take off unit but which permits the engine of the tractor to continue running, such as that shown in FIG. 6. The spring loaded pivotal bracket assembly 53 will then permit the non-rotating universal drive shaft to pivot beyond its safety angle without damaging the sensing unit 16 as bracket part 55 will pivot in either direction against the pressure of the springs 59 to relieve force applied to the sensing unit 16 in such circumstances.

Preferably there is associated with each protection system an isolating switch 60 which can be actuated to remove current from the solenoid after the engine or power take off unit has been stopped. This will then prevent damage to the solenoids 35 or 44, caused by say over-heating.

Figure 9:
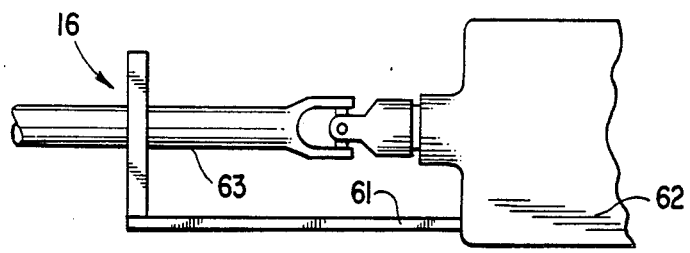
FIG. 9 illustrates protection apparatus of the present invention as applied to motor vehicles such as tractors, trucks, earthworking equipment, cars or farm implements.

Referring now to FIG. 9, there is illustrated an arrangement for applying the protection apparatus of the present invention to a conventional motor vehicle in relation to the drive or propellor shaft therefor. In this arrangement the sensing unit 16 is supported by a bracket assembly 61 to the vehicle gear box or differential 62 and the universal drive shaft 63 again passes therethrough. In this arrangement it will be seen that lateral or up and down movement of the universal drive shaft 63 beyond a safe limit will cause actuation of the sensing unit 16 which will be operative to stop operation of the vehicle engine using any of the arrangements described above.

It will also be noted that the sensing unit 16 serves to support the drive shaft in the case of say breakage of either of the universal joints or shafts. This in a vehicle will then prevent the drive shaft dropping and digging into the ground or roadway which could cause the vehicle to overturn and thus injury to the occupants or cause damage to either the differential or gear box of the vehicle. This invention therefore provides in simplified form a bracket assembly which may be of any suitable form and mounted to the vehicle chassis or from the vehicle gear box or differential and adjacent either or both ends of the drive shaft. This arrangement will ensure that in the event of either universal joint or shaft breaking, the drive shaft will be prevented from falling on to the ground or roadway.

It will be realised that the sensing means 16 may be of other forms than that described and illustrated in the drawings. Firstly, the housing 17 of the embodiment illustrated and described with reference to FIG. 2 may be of any form as desired, for example annular or rectangular in form. Alternately the sensing means may comprise a pair of spaced annular disks which are normally insulated from each other and which are moved into electrical contact with each other when at least one of them is engaged by the universal drive shaft. Similarly magnetic switches may be adapted to respond to movement of the universal drive shaft beyond a predetermined angle.

I claim:

1. Protection apparatus adapted to be associated with a universal drive shaft of the type extending between a prime mover and an implement to be driven by said prime mover, said implement being adjustable in elevation to cause said shaft to pivot in a generally vertical plane through a range of angles, said protection apparatus including
    frame means supported in a fixed attitude relative to said prime mover,
    a housing supported on said frame means and surrounding said drive shaft,
    actuator means on said housing and adapted to be engaged by said drive shaft when said drive shaft pivots beyond a predetermined angle, and
    means associated with said actuator means and operable on engagement of said drive shaft with said actuator means for removing drive from said drive shaft.

2. Protection apparatus according to claim 1 wherein said frame means is supported solely on said prime mover and extends away therefrom in generally the same direction as said drive shaft.

3. Protection apparatus according to claim 2 wherein said frame means includes
    a first frame part fixed to said prime mover and
    a second frame part pivotally supported on said first frame part and carrying said housing, and
    biasing means further permitting said second frame part and said housing, upon engagement of said shaft with said housing and movement of said shaft beyond said predetermined angle, to pivot against the bias of said biasing means to prevent damage to said apparatus.

4. Protection apparatus according to claim 1 wherein said actuator means includes a plurality of engagement members supported by resilient mounts on said housing,
    said housing further supporting switch means associated with said engagement members and adapted to be actuated by said engagement members upon movement of the letter in response to engagement by said drive shaft.

5. Protection apparatus according to claim 1 wherein said prime mover includes a power take off unit for driving said drive shaft, and wherein
    said means for removing drive from said drive shaft includes solenoid means arranged to deactivate said power take off unit upon actuation of said actuator means.

6. Protection apparatus according to claim 5 wherein said solenoid means is operatively associated with a control lever of said power take off unit and is arranged to cause said lever to move to a disengaged attitude upon actuation of said actuator means.

7. Protection apparatus according to claim 1, wherein said prime mover has a fuel injector pump, said means for removing drive from said drive shaft being operative to stop operation of said fuel pump when said drive shaft moves beyond said predetermined degree and engages said actuator means.

8. Protection apparatus adapted to be associated with a drive shaft of a vehicle, said drive shaft having a universal joint at at least one end, said apparatus including
- support frame means adapted to be secured to said vehicle and extending away therefrom in generally the same direction as said shaft,
- a generally annular support member supported at the free end of said frame means for selective adjustable movement therealong,
- locking means associated with said support member actuable to lock said support member in a desired position along said support frame means,
- actuator means on said support member adapted to be engaged by said shaft when said shaft pivots beyond a predetermined angle determined by said position of said support member along said support frame means, and
- switch means associated with said actuator means and operable when said shaft engages said actuator means to remove drive from said drive shaft.

9. Protection apparatus according to claim 8 wherein said support frame means includes
- a first frame part adapted to be fixed to said vehicle and
- a second frame part pivotally supported on said first frame part and carrying said support member, and
- biasing means associated with said second frame part for maintaining said second frame part in a desired attitude relative to said first frame part but operative to permit said shaft to pivot beyond said predetermined angle against the bias of said biasing means to prevent damage to said apparatus.

10. Protection apparatus according to claim 8 wherein said actuator means include a plurality of actuator members biased away from said switch means and operable when engaged by said shaft to cause actuation of said switch means.

11. Protection apparatus according to claim 9 wherein said support member is operable to support said drive shaft in the event of breakage of said at least one universal joint.

* * * * *